United States Patent [19]
Bruck et al.

[11] Patent Number: 4,737,612
[45] Date of Patent: Apr. 12, 1988

[54] METHOD OF WELDING

[75] Inventors: Gerald J. Bruck, Library; James E. Smith, Delmont Boro; Paul E. Denney, Pittsburgh; Ronald D. O'Brokta, Allegheny Township, Westmoreland County; Graham A. Whitlow, Murrysville, all of Pa.

[73] Assignee: Westinghouse Electric Corp., Pittsburgh, Pa.

[21] Appl. No.: 10,762

[22] Filed: Feb. 2, 1987

[51] Int. Cl.$^4$ .............................................. B23K 26/00
[52] U.S. Cl. ............................................. 219/121 LD
[58] Field of Search ................. 219/121 LC, 121 LD, 219/121 LU, 121 LV

[56] References Cited
U.S. PATENT DOCUMENTS
4,634,832  1/1987  Martyr .......................... 219/121 LC Primary Examiner—C. L. Albritton

[57] ABSTRACT

Virgin metal and metal alloy components are welded with and without filler material using a laser without cleaning the surfaces to be joined of mill scale and/or surface oxides, paints grease and other forms of contamination, and without edge preparation. The uncleaned, unprepared surfaces are placed in contact with each other, and a 100% through the thickness laser keyhole weld without filler metal is made in one pass, full penetration is achieved by two laser keyhole welds without filler metal (one made from each side), or resistively heated filler wire is fed into the metal pool of a laser conduction weld in one or more passes along each side of the confronting surfaces to be joined. Quality welds are made despite gaps of varying size up to about 0.125 inches between the parts to be joined.

6 Claims, 5 Drawing Sheets

METHOD OF WELDING

BACKGROUND OF INVENTION

1. Field of Invention

This invention relates to a method of welding metal components using a laser beam and more particularly to welding such components with a laser beam without prior surface cleaning or edge preparation.

2. Background Information

In conventional welding processes, such a gas-metal-arc welding (CMAW), gas-tungsten-arc-welding (GTAW) are flash welding (FW), existing practice is to utilize cleaned surfaces, frequently accompanied by special end preparations machined on the mating surfaces of the parts to be welded. Cleaning of the surfaces to be welded is necessary, principally, because the natural oxides present on the surfaces tend to inhibit wetting. Additionally, they may contribute to weld metal contamination forming porosity and cracks thus resulting in the production of inferior quality weldments with corresponding lower mechanical properties. Likewise, the efficient welding of many components may necessitate expensive and time consuming machining operations to produce the required edge preparation on the parts prior to the welding process.

These welding processes also require feeding metal filler wire into the weld to build up the weldment. Conventionally, electrical continuity must be established through the feed wire to melt it. A recently developed feed drive described in U.S. Pat. No. 4,447,703 resistively heats the filler wire prior to its entry into the weld pool.

Lasers are now being used to weld metal components, however, it is still the practice to clean the surfaces to be joined and prepare the edges in the same manner as with the other prior art welding methods.

In one form of laser welding used on heavy sections called keyhole welding, the beam is sharply focused to increase energy density and create a hole or cavity surrounded by liquid metal in the base metal which moves along with the laser beam as the parts are joined in one pass. A good fit between the parts to be joined has been considered a prerequisite for such keyhole welding which requires in many instances edge preparation to assure good contact of the surfaces to be joined. This is done in addition to thorough cleaning of the surfaces to remove contamination prior to welding. In conduction laser welding a less focused beam is used with filler wire. Again, it has been considered necessary to remove surface contaminants prior to welding.

In many applications, parts to be joined by welding are covered with oxides, mill scale, grease or paint et cetera. It is time consuming to remove these contaminants before welding, but to date it has been considered a necessary step in achieving a quality weld. Edge preparation is also time consuming and expensive, but has also been considered a prerequisite to producing a good weld.

It is a primary object of the invention to provide a method of welding metal components which does not require surface cleaning or edge preparation.

SUMMARY OF THE INVENTION

This and other objects are realized by the invention which provides for welding virgin, thick walled metal and metal alloy components with surface contamination, such as mill scale, surface oxides, paint, grease et cetera, on the surfaces to be joined. The components are placed with the surfaces to be joined in contact with each other with the contamination still on such surfaces and without edge preparation. In accordance with one aspect of the invention, a laser beam is directed at one component adjacent the other component and moved along the one component at a rate and with a focused power sufficient to produce a keyhole weld through substantially 100% of the thickness to be joined in one pass. Thus, a quality 100% through weld is produced in one pass without any surface cleaning or edge preparation. This greatly increases productivity and reduces costs. Alternately, keyhole welds through substantially 50% of the thickness to be joined can be made with one pass along each side of the surfaces to be joined.

In accordance with another aspect of the invention, the laser beam is directed at the components along one edge of the contaminated surfaces to be joined with a power and focus to produce a conduction weld with a molten pool. Resistively heated filler wire is fed into this molten pool. The laser beam and wire feed are moved along the one edge of the surfaces to be joined at a rate to produce a filled weld at least halfway through the thickness in one pass. The process is then repeated from the other side of the surfaces to be joined to produce a full thickness weld. Again, no surface cleaning or edge preparation is required to quickly, and efficiently produce a quality weld.

Unlike other welding processes where it has been found necessary to prepare the surfaces to assure a good mechanical fit prior to welding, quality welds can be produced by the techniques of the invention with variable gaps between the surfaces to be joined of as much as about 0.188 inches.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to welding a pipe or tube to the edge of a plate; however, it will be appreciated that the techniques of the invention have application to welding all sorts of shapes of metal and metal alloy components.

Figure 1:
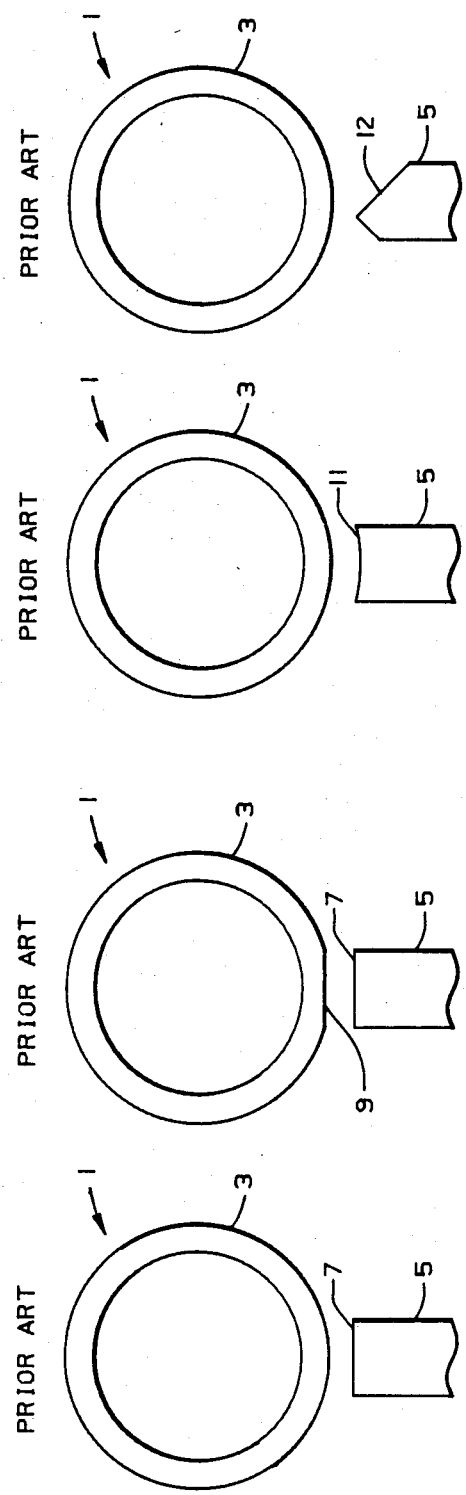
FIGS. 1a, b, c and d illustrate the manner in which components were prepared in accordance with the prior art to obtain a good mechanical fit for welding.

Under prior art techniques of welding, including laser welding, the practice is to first remove all surface contamination such as mill scale, surface oxides, paint, grease et cetera. In the case of non-complementary surfaces, such as the cylindrical surface 3 of a pipe 1 and the edge 7 of a plate 5 illustrated in FIG. 1a, it is also common practice to prepare the surfaces to be joined to achieve a good mechanical fit, such as by milling a flat 9 on the cylindrical surface 3 of the pipe as shown in FIG. 1b, or a concave surface 11 on the edge 7 of the plate, or an edge preparation 12 such as shown in FIG. 1d. The cleaned and prepared surfaces are then brought into full contact for a conventional welding process, including laser conduction welding, with filler metal additions, along both edges of the joined surfaces, or laser keyhole welding in one pass. Both the surface cleaning and edge preparation steps require time and add to the cost of welding.

We have discovered novel and improved methods for producing high quality welds with attendant cost savings utilizing laser beam welding with and without filler metal additions. These methods include the elimination of surface cleaning and edge preparation prior to welding, and even welding where there are variable gaps of as much as about 0.188 inches at the intersection of the surfaces to be joined caused by irregularities in the virgin surfaces to be joined.

Figure 2:
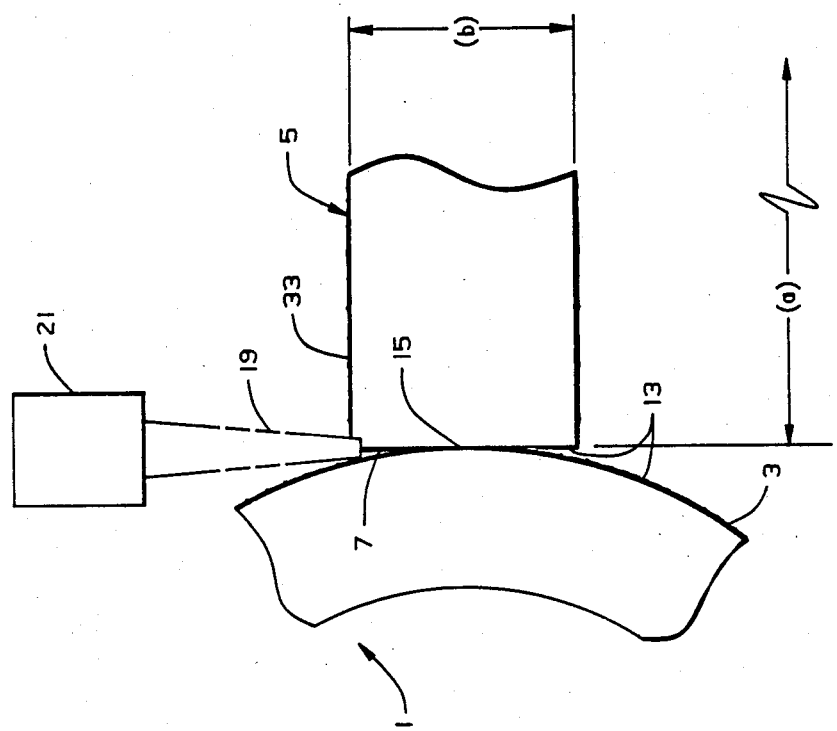
FIG. 2 is an end elevation view illustrating the manner in which a pipe or tube and plate are set-up for welding in accordance with the invention, and the manner in which a laser beam is focused on this set-up in accordance with one embodiment of the invention.
Figure 3:
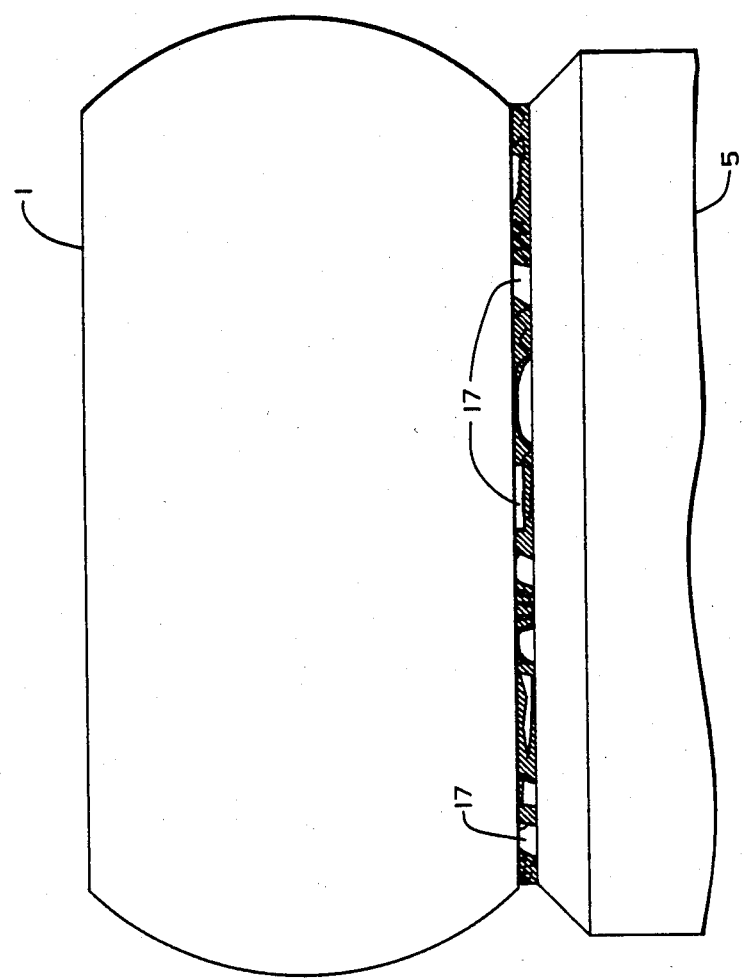
FIG. 3 is a top view of the set-up of the components in FIG. 2.

FIG. 2 illustrates the arrangement for welding the pipe 1 to the edge 7 of plate 5 with these components in the virgin state. That is, with the cylindrical surface 3 of the pipe and the edge 7 of the plate covered with surface contamination 13, such as mill scale, and/or surface oxides, paint, grease or other contaminants, and with no edge preparation. Thus, it can be seen from FIG. 2 that there is only line contact at 15 between the surfaces to be joined. As shown in the top view of FIG. 3, there can be gaps 17 in this line contact caused by irregularities in the surfaces to be joined or in the surface contamination 13.

Figure 5:
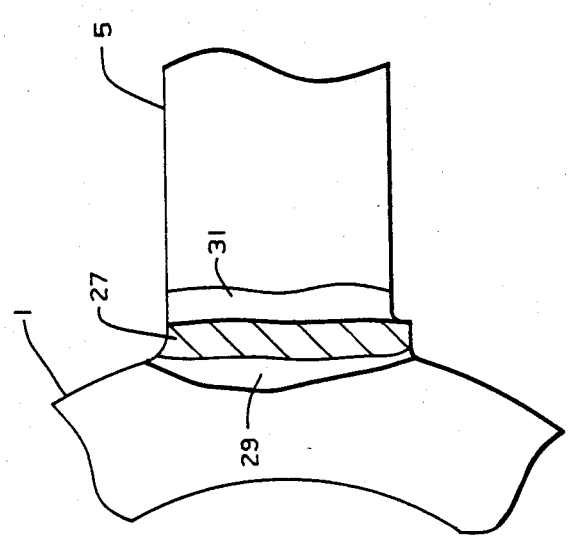
FIG. 5 is a cross-sectional view of the weldment made in accordance with the embodiment of the invention illustrated in FIG. 4.
Figure 4:
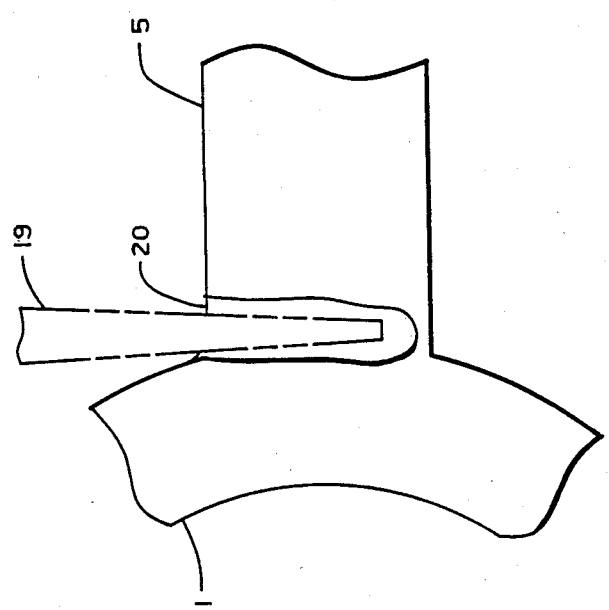
FIG. 4 is a cross-sectional view through the components of FIG. 2 as they are being welded in accordance with one embodiment of the invention.

FIG. 2 also illustrates the manner in which a laser beam 19 generated by the laser source 21 is focused to join the components 1 and 5 by the techniques of keyhole laser welding. As can be seen, the beam 19 is directed along the edge 7 of the plate 5. The power and focus of the laser beam 19 and the rate at which it is moved along the edge 7 transverse to the plane of FIG. 2, are selected so that the power density is sufficient (about 2 to 5 million watts per square centimeter) for the beam to form a hole, or keyhole, 20 in molten metal which is sustained by ionized metal vapors as shown in FIG. 4. Such a keyhole weld produces a 100% through weld in one pass as shown in FIG. 5. The crosshatched area 27 is the weld nugget which is flanked by the heat affected zones 29 and 31 of the pipe 1 and plate 5, respectively.

Example No. 1

Tubes with a 2 inch outside diameter and a 0.310 inch wall made of ASTM A210 carbon steel were set against the edge 7 of plates 5, which were 1.5 inches wide (dimension "a" in FIG. 2) and 0.5 inches thick (dimension "b") and made of ASTM A36 carbon steel. Both components in the as received state exhibited surface oxide (rust) and/or mill scale and neither received any surface cleaning or edge preparation prior to welding. Additionally, as set-up, the magnitude of the gap 15 between the tube and plates varied over the length of the weldments from 0 up to about 0.0625 inches.

A 15 kw $CO_2$ laser was used to produce 100% through the thickness welds in one pass without the use of filler metal. The welds were made with a delivered beam power of 11 kw and the beam focal point elevation relative to the top face 33 of the plate 5 was in the range of +0.100 to −0.100 inches with a beam waist of 0.040 inches. The beam was moved along the edge of the plate at speeds of from 25 to 35 inches per minute.

While a focal point elevation of +0.100 to −0.100 inches is desired, elevations of about +0.400 to −0.400 inches will produce a satisfactory weld. In addition suitable combinations of power between about 4 kw and 15 kw and speeds in the range of about 20 to 70 inches per minute can be used.

Key elements, in this example, are the through the thickness welds achieved in a single pass in relatively heavy section pieces, at welding speeds considerably higher than may be achieved in current welding processes. Successful welds (see FIG. 5) were made without filler metal additions and in the absence of any prior surface/edge preparation. Some later welds prepared in a similar manner, but with cold wire (unheated filler metal additions) were equally successful; this may be attractive, where the application requires a contoured surface fillet.

Figure 6:
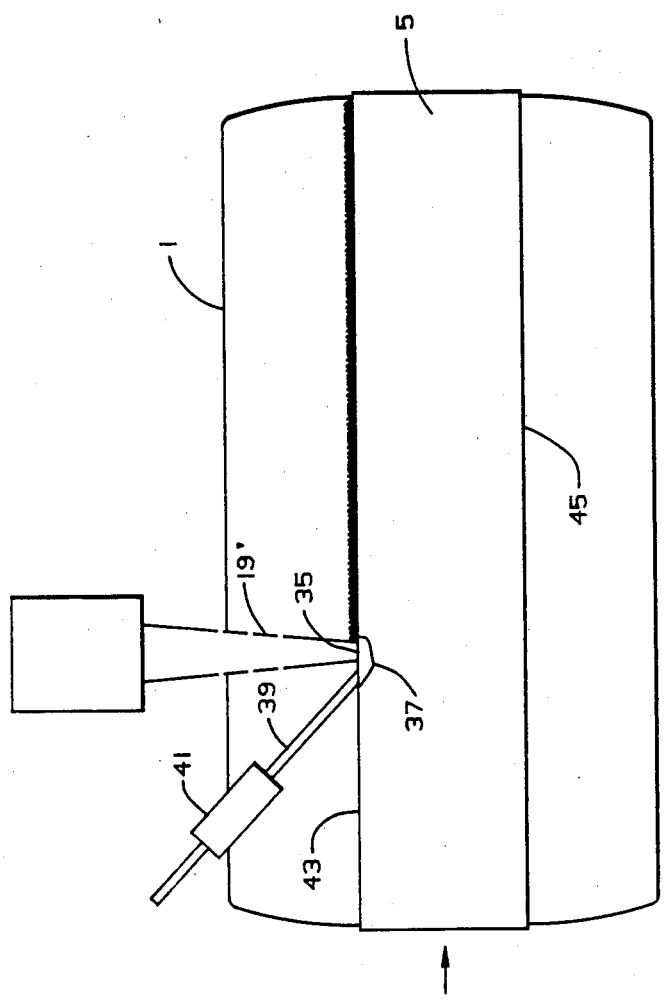
FIG. 6 is a side elevation view of the components of FIG. 2 as they are being welded in accordance with another embodiment of the invention.

In accordance with another aspect of the invention, welding with filler metal additions can be achieved without surface cleaning or edge preparation. The components are positioned as shown in FIG. 2. In this instance, a laser beam 19 with a larger waist 35, and therefore lower power density, is directed at the adjacent portions of one or both of the components to be joined as shown in FIG. 6. This produces a conduction weld of molten pool 37 of metal. Heated filler wire 39 is fed into the molten pool 37 to add filler material to the weld by the device 41 described in U.S. Pat. No. 4,447,703 as the pipe and plate are moved in the direction of the arrow in FIG. 6 relative to the laser beam 19′. A single pass is made along each edge of the surface 43 and 45 to be joined to produce the finished weld shown in cross section in FIG. 7.

Example No. 2

The same tube and plate components as used in Example 1 when similarly set up as shown in FIG. 2. Again no surface cleaning or edge preparation were performed on the as received components which both exhibited surface oxide and/or mill scale, and the gap 15 between the tube and plate varied over the length of the weldment of 0 to about 0.125 inches. The same 15 kw $CO_2$ laser was used at a delivered power of 9 KW and a focal point of +0.75 inches (focus above the plate surface) to produce a conduction weld. E-70S-6 carbon steel 0.045 inch diameter metal filler wire, which was resistively heated to approximately 350 degrees F prior to entry into the weld pool 37, was automatically fed into the gap between the plate 5 and tube 1 at feed rates up to 100 inches per minute. The laser beam was advanced at a speed of 10 inches per minute to complete the weld along one side of the intersection between the pipe (tube) and plate in one pass. After completion of the one pass, the same procedure was repeated on the reverse side of the weldment.

Successful welds with filler metal can be made on such components using this technique with beam powers in the range of 8 to 15 KW, with focal point elevations of up to about +1.25 to −1.25 inches and speeds of 5 to 30 inches per minute.

Figure 7:
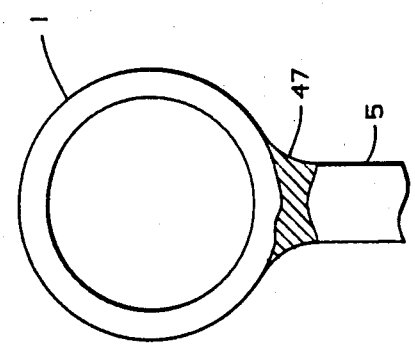
FIG. 7 is an end view of the components of FIG. 2 welded in accordance with the embodiment of the invention illustrated in FIG. 6.

The weld joint 47 shown in FIG. 7 demonstrates that a high quality, full penetration weld was achieved in just two passes, and may be compared to the many passes necessary in e.g., the build-up of a heavy section groove in conventional GMAW welding.

There was no indication that wetting, oxide contamination, or area of fusion were in any way adversely affected by the elimination of surface cleaning procedures and edge preparations, which typically are necessary prerequisites in current, state-of-the-art practices. Additional experiments have shown that the width of the gap between the tube and the plate may be increased to 0.188 in. and high quality welds will still be achieved. It should be noted that all these welds have been made without the use of a back-up plate set-up Key features in this example, to which successful welding of these thick walled components may be attributed, are the combinatoin of the laser beam and the high deposition rate, hot filler wire additions. Unlike arc welding, where oxides can cause inhomogeneities electrically insulating the workpiece from the electrode, the advanced hot wire process, utilized in this disclosure is electrically independent of the workpiece.

The rapid heating rate and highly localized heating produced by the laser in these examples may have resulted in rapid removal of the surface oxides enabling good coupling between the weld pool and the parts being welded to be achieved. The initial laser beam coupling was most likely enhanced by the lower reflectivity of the as received surfaces of both the tube and the plate. The lower surface reflectivity may contribute to improved weld metal cleanliness through preferential beam coupling and evaporation of surface contaminants.

The techniques described in the above examples are most effective in thick walled or heavy section pieces, about ½ inch to ¾ inch thick, but they are not limited to the sizes noted above. Indeed, we believe that they offer advantages in the welding of even thick sections, up to about 1.5 inches, particularly in terms of cost effectiveness and time savings, and with modifications to the beam-workpiece set up, even thicker sections can be accommodated. Where a single pass is made from both sides of the surfaces to be joined, these thicknesses could be double (3 in).

We anticipate that similar behavior will be exhibited by other materials such as, but not limited to stainless steels, nickel base and other nonferrous alloys. In addition, welds may be made between parts of different chemical composition using the methods described in this disclosure.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of welding virgin, thick walled metal and metal alloy components having surface contamination on the surfaces to be joined, comprising the steps of:
   placing the components with the surfaces to be joined in contact with each other with the contamination still on such surfaces and without edge preparation;
   directing a laser beam at one component adjacent the other component; and
   moving said laser beam along the one component adjacent the other component, said laser beam having a focused power and being moved at a rate to produce a keyhole weld through substantially 50% to 100% of the thickness to be joined in one pass.

2. The method of claim 1 including placing the components with the surfaces to be joined in contact with each other with variable gaps of as much as about 0.125 inches produced by irregularities in the surfaces to be joined.

3. The method of claim 1 wherein one of said components is a cylindrical tube and the other is a plate having an edge wherein said tube and plate are placed with said edge of the plate longitudinally in contact with said tube and wherein said laser beam is directed at and moved along said edge of the plate to produce said keyhole weld.

4. A method of welding virgin, thick walled metal and metal alloy components having surface contamination on the surfaces to be joined, comprising the steps of:
   (a) placing said components with the surfaces to be joined in contact with each other with the surface contamination still on such surfaces and without edge preparation;
   (b) directing a laser beam at said components from one side of the intersection of the surfaces to be joined, said laser beam having a power and focus to produce a conduction weld with a pool of molten metal;
   (c) feeding resistively heated filler wire at controlled rates into said molten pool;
   (d) moving said laser beam and filler wire feed along said intersection at a rate to produce a filled weld in one or more passes; and
   (e) repeating steps (b) through (d) from the opposite side of the intersection of said surfaces to be joined.

5. The method of claim 4 including placing the components with the surfaces to be joined in contact with each other with variable gaps of as much as about 0.188 inches produced by irregularities in the surfaces to be joined, and varying at least one of the rate at which the laser beam is moved relative to the components to be joined and the rate at which the filler wire is fed to accommodate for said variable gaps.

6. The method of claim 1 wherein said laser beam is moved along the one component adjacent the other component with the laser beam having a focused power and being moved at a rate to produce a keyhole weld through substantially 50% of the thickness to be joined in one pass from each side of the components to be joined.

* * * * *